J. W. AKER.
TIRE PUMP.
APPLICATION FILED JUNE 26, 1916.
1,229,854.
Patented June 12, 1917.
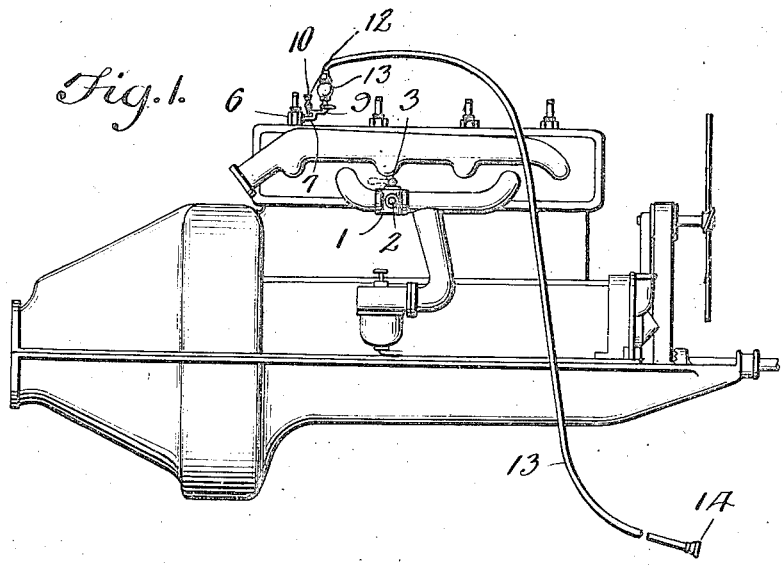
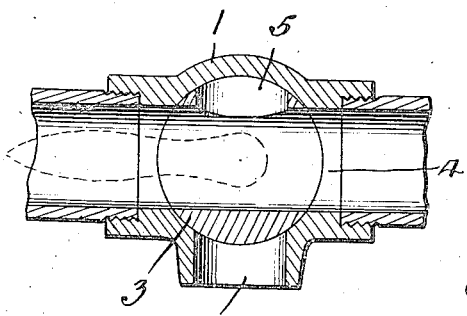
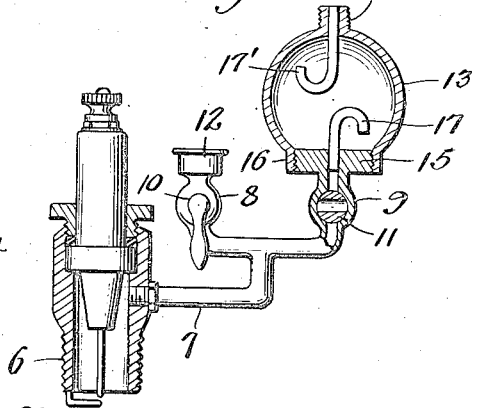
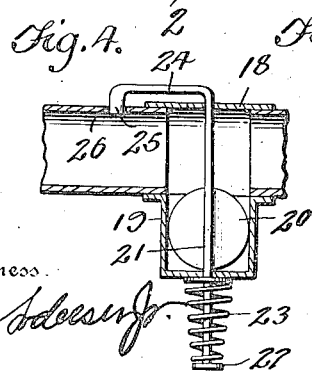
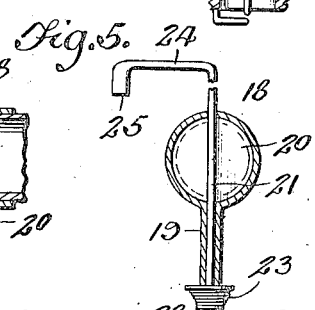
Inventor
J. W. Aker,
By Victor J. Evans
Attorney
Witness

UNITED STATES PATENT OFFICE.

JOHN W. AKER, OF LANCASTER, KENTUCKY.

TIRE-PUMP.

1,229,854.

Specification of Letters Patent. Patented June 12, 1917.

Application filed June 26, 1916. Serial No. 105,925.

*To all whom it may concern:*

Be it known that I, JOHN W. AKER, a citizen of the United States, residing at Lancaster, in the county of Garrard and State of Kentucky, have invented new and useful Improvements in Tire-Pumps, of which the following is a specification.

This invention relates to improvements in means for inflating automobile tires.

In carrying out my invention it is my purpose to utilize one or more of the cylinders of an automobile engine as an air compressor, and to provide a suitable connection between the same and the tire, so that the tire may be easily and quickly inflated to a desired pressure without interfering with the ignition or free working of the pistons in all of the engine cylinders.

It is also my purpose to provide means for converting a cylinder of any ordinary multi-cylinder engine into an air pump by arranging in the branch of the fuel inlet pipe of the cylinder a valved casing having a port communicating with the atmosphere and having a valve therein to close the intake passage and open the air port, and to provide a spark plug for the said cylinder with a hollow casing which has a valved connection with a flexible tube provided at its end with a nipple to engage with the valve of the pneumatic tire.

With the above and other objects in view the improvement resides in the construction, combination and arrangement of parts set forth in the following specification and falling within the scope of the appended claims.

In the drawing:

Figure 1 is an elevation of an automobile engine provided with my improvement, Fig. 2 is an enlarged detail horizontal sectional view through the valve connected with the fuel intake pipe, Fig. 3 is a sectional view through the hollow casing of the spark plug, Fig. 4 is a detail horizontal sectional view illustrating a modified form of the valve connected with the intake pipe, and Fig. 5 is a central transverse sectional view through the same, the valve being actuated to close the fuel passage of the intake pipe.

While my improvement may be provided upon any ordinary construction of multi-cylindered automobile engines, I have shown the same as applied to the engine of an ordinary "Ford" automobile of the four-cylinder type. As in this class of engines each pair of adjacent cylinders receives its intake through one of the branches of the manifold leading from the carbureter, I provide one of the branches communicating with the cylinders next to the dashboard or front of the automobile with a valve casing 1 having a part 2 therein communicating with the atmosphere. In this class of engines the outer cylinders are employed as pumps but it is to be understood that in other classes of engines only the intake pipe for one of the cylinders is provided with a valve casing. I arrange in the casing 1 a valve 3 having a central longitudinal port 4 which is adapted to close the air port 2 of the valve casing 1 to permit of the gas passing from the carbureter through both of the branches of the manifold to all of the cylinders of the engine. The valve is provided with a second port 5 arranged centrally and communicating with the port 4, and when the valve is turned to close the intake passage the port 3 will communicate with the branch of the manifold leading to the engine cylinder, while one end of the passage 4 will be in a line with the air port 2 of the valve casing 1. Three of the engine cylinders are provided with the usual spark plugs but the spark plug upon the outer cylinder or the cylinder disposed nearest the front or dashboard of the vehicle is of a slightly different construction inasmuch as the same includes a hollow sleeve 6 which is screwed or otherwise secured to the said cylinder and the sleeve 6 has attached thereto an outlet pipe 7 which is provided with two branches 8 and 9 respectively, each of said branches having valves 10 and 11 respectively and the branch 8 has its end cup-shaped, as at 12, to receive gasolene or a similar fluid when the cylinder is to be primed. The branch 9 has attached thereto a flexible hose 13 which has its end provided with a nipple 14 and this nipple is so arranged as to engage with the inflating tube of the vehicle tire.

In order that no carbon or other foreign matter may be pumped from the cylinder through the tube 13 into the pneumatic tire, I threadedly connect with the branch 9, outward of the valve 11, a globular chamber 13. This chamber is provided with a central reduced neck 14 to which one end of the tube 13 is connected. The branch 9 preferably has its end formed with a head 15 in the nature of a disk and provided with peripheral threads to receive the interior threads of the flange 16 of the chamber 13, and the head 15, at the port or passage of the branch 9 is provided with an outwardly extending substantially U-shaped pipe 16. The neck 14 has its port or passage provided with a similar pipe 17, but the hooked end of the passage 17 is arranged in an opposite direction from the hooked end of the pipe 16. By this arrangement it will be noted that any foreign matter passing through the pipe 16 will be deposited within the chamber 13 and by arranging the hooked pipe 17 at the opposite end of the chamber, the said foreign matter will not be permitted to pass through the said pipe 17 and consequently through the tube 13.

If desired in lieu of the ordinary construction of two-way valves, such as that previously described, I may arrange upon the intake pipe from the fuel manifold, a valve casing 18 having a depending portion providing a pocket 19 and within this pocket normally rests a butterfly valve 20. This valve is provided with a stem 21 which projects through the lower end of the pocket and through the outer surface of the said valve casing 18, the lower end of the said stem being provided with a head 22 and is surrounded by a helical spring 23 which exerts a pressure between the head 22 and the outer wall of the pocket 19. The end of the stem 20, projecting through the valve casing 18, is arranged at a right angle to the portion thereof connected with the butterfly valve 20, as indicated by the numeral 24, and this crank or handle end of the stem is provided with a downturned preferably enlarged end 25 which normally closes a port 26 in the intake pipe leading to the cylinder employed as a pump. It will be apparent, by reference to Fig. 5 of the drawings, that when the handle of the valve is operated to draw the same from the pocket to within the valve casing proper, and when the said valve is rotated as disclosed in the said Fig. 5, the fuel inlet will be closed and air will be admitted to the pump cylinder through the port 25.

The tube 13 may and preferably does remain a permanent part of the engine and is, of course, of a length whereby the same may be attached to the type of automobiles needing inflating, and the simplicity and advantages of the structure, when taken in connection with the accompanying drawings, will, it is thought, be perfectly apparent to those skilled in the art to which such invention appertains without further detailed description.

Having thus described the invention, what I claim is:

1. A device for inflating automobile tires consisting of a cylinder of a multi-cylindered automobile engine, a fuel intake for the cylinder, a valve casing having an air port in the fuel intake of the said cylinder, a three-way valve in the casing, a spark plug including a tubular sleeve which is connected with the said cylinder, a valve pipe for the tubular sleeve, and a flexible tube connected with the said pipe and having a nipple and to engage with the valve of the tire to be inflated.

2. A device for inflating automobile tires including one cylinder of a multi-cylindered engine for an automobile, a valve casing having an air inlet connected with the valve intake of the manifold of the engine leading to the said cylinder, a valve in the casing whereby to close the fuel passage and open the air inlet, a spark plug having a tubular sleeve surrounding the same connected with the said cylinder of the automobile engine, a valved outlet pipe for the said sleeve, a chamber connected with the outlet pipe, pipe members having oppositely rounded ends at the inlet and outlet passage of the chamber, and a flexible tube connected with the outlet of the chamber.

JOHN W. AKER.